Oct. 14, 1952         O. CULLMAN         2,613,544

MOUNTING FOR TRANSMISSION GEARING AND GUARD

Filed Aug. 17, 1951

*INVENTOR:*
OTTO CULLMAN
BY

ATT'YS

Patented Oct. 14, 1952

2,613,544

UNITED STATES PATENT OFFICE 2,613,544

MOUNTING FOR TRANSMISSION GEARING AND GUARD

Otto Cullman, Chicago, Ill., assignor to Cullman Wheel Co., Chicago, Ill., a corporation of Illinois Application August 17, 1951, Serial No. 242,260

5 Claims. (Cl. 74—219)

This invention relates to motor-driven, mechanical devices, particularly such as grinders where the speed-reduction gearing requires a plurality of transfers involving a succession of transmission belts or gear trains overhanging the bearings of the motor and the driven machine to such an extent as to require additional bearings at the ends of the shafts.

The main objects of this invention are to provide an improved form of transmission shaft and bearing construction for use in cases where a high speed motor is geared down for driving a slow speed machine, such as a grinder; to provide an improved transmission unit structure suitable for use in connection with existing motors and machines, regardless of the length that the shafts thereof extend beyond their bearings; to provide simple means for bracing the driving and driven shafts to take the strain of the gearing and for mounting a guard for housing such transmission mechanism.

A specific embodiment of this invention is shown in the accompanying drawings in which.

Figure 1:
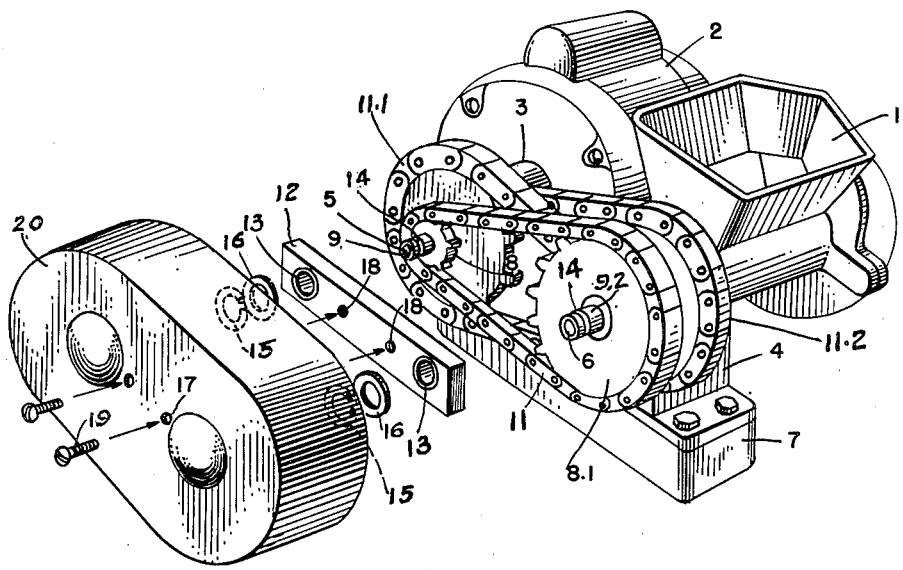
Figure 1 is a perspective view of a motor-driven wheat grinder constructed according to this invention, with some of the parts separated in exploded relation to the body of the machine.

In the form shown in the drawings, a machine 1, such as for example a grain grinder and its motor 2 assembled as a unitary structure, may have bearings 3 and 4 for its driving shaft 5 and driven shaft 6 mounted on a common base 7.

As shown in the drawings, the motor shaft 5 and the grinder shaft 6 are connected by a multiple-step, speed-reducing power transmission gearing unit comprising a succession of cogwheels in gear train relation to each other. These are preferably sprocket wheels and chain belts.

In order that this transmission mechanism may be used with any standard motor and any standard machine, regardless of the length to which the motor shaft might extend beyond its bearings, the sprocket wheels are mounted on sleeves bored to receive the shafts 5 and 6 and adapted to serve as removable extensions of said shafts.

Figure 2:
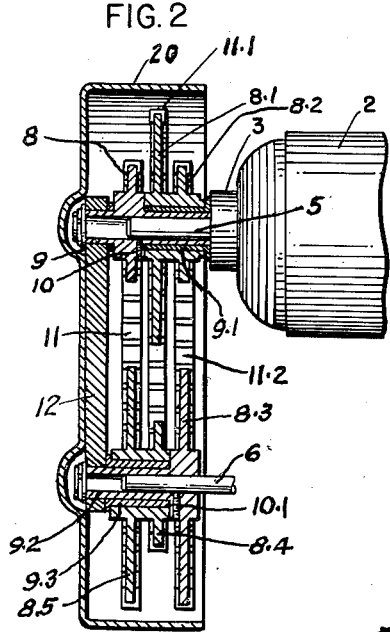
Fig. 2 is a sectional view of the transmission mechanism and its guard taken in the plane of the axes of the driving and driven shafts.

In the specific form shown in Fig. 2, the sprocket pinion 8 is integral with the sleeve 9 and both are secured to the driving shaft 5 by a setscrew 10. The sleeve 9 extends beyond both sides of the pinion 8 and has loosely journaled thereon, at one side of the pinion 8, a sprocket wheel 8.1 and pinion 8.2 which may be connected by a common hub with a bearing bushing 9.1 between the hub and sleeve. Similarly mounted on the driven shaft 6 is a sleeve 9.2 which is integral with a sprocket wheel 8.3 fastened to shaft 6 by setscrew 10.1. A pinion 8.4 and sprocket wheel 8.5, which are integrally connected by a common hub, are loosely journaled on the sleeve 9.2 with an intervening bushing 9.3. The pinion 8 and wheel 8.5 are connected by a chain belt 11. The pinion 8.4 is connected with the wheel 8.1 by chain belt 11.1, and sprocket pinion 8.2 is connected with sprocket wheel 8.3 by chain belt 11.2.

Figure 3:
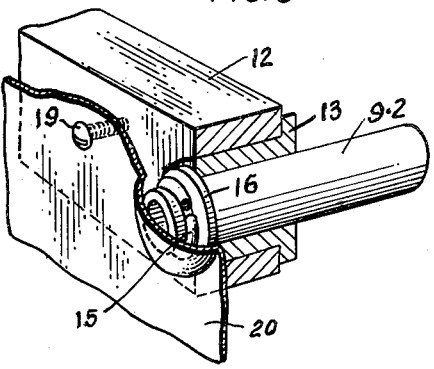
Fig. 3 is an enlarged fragmentary detail in perspective showing one of the shaft-end bearings in assembled relation to adjacent parts.

The outer ends of the sleeves 9 and 9.2, which are at the left of Fig. 2, are journaled in bearings in a frame bar 12, which may have bushings 13, as shown in Figs. 1 and 3. These bushings are omitted for clearness in Fig. 2. In order to secure the bar 12 against accidental displacement from the sleeves 9 and 9.2, these sleeves have annular grooves 14 in which spring rings 15 are seated so as to bear against intervening washers 16. The frame bar 12 is tapped at 18 for setscrews 19 which pass through apertures 17 in the transmission guard housing 20 to connect this housing to the bar 12.

In operation the pinion 8 drives the sprocket 8.5 at reduced speed, the sprocket 8.5 drives pinion 8.4 through its direct connection therewith, and this pinion 8.4 drives the sprocket wheel 8.1 which is integral with pinion 8.2 and the latter drives the sprocket wheel 8.3, which is directly connected to the shaft 6. There is thus a three-step speed reduction between shafts 5 and 6.

The transmission unit as a whole may be disconnected from the driving and driven shafts 5 and 6, by merely removing the guard housing 20 and releasing the setscrews 10 and 10.1. This enables the motor, the driven machine, or both, to be removed for the purpose of repair without disassembling the transmission unit inasmuch as the bar 12 maintains the sprocket wheels and their connecting chains in their assembled relation, even when removed from the shafts.

Any bending strains upon the shafts 5 and 6, due to the pull of the chain drive shown or the corresponding thrust that would exist in the case of transmission gears, would, in the form shown, be absorbed by the bar 12 in such manner as to render unnecessary any connection between this bar and frame structure of the machine other than through the shafts.

Although but one specific embodiment of this invention is herein shown and described, it will be understood that numerous details of the construction shown may be altered or omitted without departing from the spirit of the invention as defined by the following claims.

I claim:

1. In a power transmission mechanism having a pair of parallel shafts extending beyond their bearings with sprocket and chain drive between the overhanging parts of said shafts, a stiff bar connecting the ends of said shafts and having bearings therefor, each said shaft having an annular groove near its outer end, snap rings seated in said grooves, and washers interposed between said snap rings and said bar.

2. In a power transmission mechanism having a pair of parallel shafts extending beyond their bearings with sprocket and chain drive between the overhanging parts of said shafts, a stiff bar connecting the ends of said shafts and having bearings therefor, means interposed between said shafts and bearing bar to hold said bar in place thereon, and a guard housing removably attached to said bar.

3. In a device of the class described, a driving shaft, a driven shaft, a base, bearings for said shafts fixedly mounted on said base, said shafts extending in overhung parallel relation beyond said bearings, transmission mechanism connecting the overhanging parts of said shafts, a brace bar connecting the ends of said shafts beyond said transmission mechanism and having bearings for said shafts, means on said shafts to hold said bar in place thereon, and a guard housing attached to said bar and having walls enclosing said transmission mechanism.

4. A transmission unit comprising a driving shaft, a sleeve fast on said driving shaft, a cogwheel fast on said sleeve, a pair of connected cogwheels loosely journaled on said sleeve, a driven shaft, a second sleeve fast on said driven shaft, a pair of connected cogwheels loosely journaled on said second sleeve and drivingly related respectively to said first-named cogwheel and the next adjacent member of the pair of loosely journaled cogwheels on said driving shaft sleeve, a cogwheel fixed on said driven shaft sleeve and drivingly related to the other member of said first-named pair of connected cogwheels, a frame bar connecting said sleeves, said bar having bearings in which said sleeves are journaled, and means acting between said bar and sleeves to hold said bar on said sleeves.

5. Power transmission mechanism, comprising a driving shaft, a driven shaft, relatively fixed bearings in which said shafts are journaled with free end portions of said shafts projecting from said bearings, a sleeve on the end portion of said driving shaft, a second sleeve on the end portion of said driven shaft, multiple step transmission gearing drivingly connecting said sleeves, means detachably connecting each sleeve to its respective said shaft, a bar having bearings for said sleeves at the ends thereof that are remote from said shaft bearings, and means on said sleeves for holding said bar in place thereon.

OTTO CULLMAN.

REFERENCES CITED

The following references are of record in the file of this patent:

UNITED STATES PATENTS

| Number | Name | Date |
|---|---|---|
| 642,242 | Miller | Jan. 30, 1900 |
| 1,854,018 | Carlberg | Apr. 12, 1932 |
| 2,171,158 | McCann | Aug. 29, 1939 |
| 2,430,798 | Alexander | Nov. 11, 1947 |

FOREIGN PATENTS

| Number | Country | Date |
|---|---|---|
| 707,267 | France | Apr. 13, 1931 |